(12) United States Patent
Kountanya et al.

(10) Patent No.: US 9,089,900 B2
(45) Date of Patent: Jul. 28, 2015

(54) METHOD OF PRODUCING HOLES AND COUNTERSINKS IN POLYCRYSTALLINE BODIES

(75) Inventors: Raja Kountanya, Manchester, CT (US); Lawrence Thomas Dues, Dublin, OH (US)

(73) Assignee: Diamond Innovations, Inc., Worthington, OH (US)

( * ) Notice: Subject to any disclaimer, the term of this patent is extended or adjusted under 35 U.S.C. 154(b) by 727 days.

(21) Appl. No.: 13/334,246

(22) Filed: Dec. 22, 2011

(65) Prior Publication Data

US 2012/0170988 A1    Jul. 5, 2012

Related U.S. Application Data

(60) Provisional application No. 61/428,884, filed on Dec. 31, 2010.

(51) Int. Cl.
| | |
|---|---|
| *B23H 9/00* | (2006.01) |
| *B23H 7/02* | (2006.01) |
| *B23H 5/04* | (2006.01) |
| *B23H 9/14* | (2006.01) |
| *B23H 7/10* | (2006.01) |
| *B23B 27/14* | (2006.01) |

(52) U.S. Cl.
CPC ............ *B23B 27/141* (2013.01); *B23H 7/02* (2013.01); *B23H 7/101* (2013.01); *B23H 9/14* (2013.01); *B23B 2200/3618* (2013.01); *B23B 2226/125* (2013.01); *B23B 2226/315* (2013.01); *B23H 5/04* (2013.01); *B23H 2200/20* (2013.01); *Y10T 407/27* (2015.01)

(58) Field of Classification Search
CPC .............. B23H 5/04; B23H 7/02; B23H 9/00; B23H 9/14; B23H 7/101; B23H 2200/20; B23K 26/381; B23K 26/383; B23K 2201/20; B23K 2201/02; B23B 27/141; B23B 2200/3618; B23B 2226/125; B23B 2226/315
USPC .................. 219/69.12, 69.17, 69.11, 121.71; 264/400
See application file for complete search history.

(56) References Cited

U.S. PATENT DOCUMENTS

| | | | |
|---|---|---|---|
| 4,641,007 A * | 2/1987 | Lach ......................... | 219/69.17 |
| 4,849,602 A * | 7/1989 | Gardner .................. | 219/121.71 |
| 6,120,570 A | 9/2000 | Packer et al. | |

(Continued)

FOREIGN PATENT DOCUMENTS

| | | |
|---|---|---|
| EP | 0299143 A1 | 1/1989 |
| EP | 0596742 A1 | 11/1994 |

(Continued)

*Primary Examiner* — Geoffrey S Evans
(74) *Attorney, Agent, or Firm* — Keith G. DeMaggio

(57) ABSTRACT

A method of producing at least one through-hole and countersink in at least one ultrahard insert including the steps of providing a body having a first major surface and an opposite second major surface; forming at least one pilot hole in said body using a laser, wherein said at least one pilot hole extends from said first major surface to the opposite second major surface of said body; cutting said pilot hole using a wire electrical discharge machine (WEDM) to produce a straight cylindrical portion and top conical portion; forming a countersink on at least one side of said body using an electrical discharge grinding machine (EDG); and severing said at least one ultrahard insert from said body forming a finished insert, wherein said finished insert includes a through-hole and a countersink.

14 Claims, 8 Drawing Sheets

(56) References Cited

U.S. PATENT DOCUMENTS

| | | | |
|---|---|---|---|
| 6,287,352 B1 | 9/2001 | Littecke et al. | |
| 7,322,776 B2 * | 1/2008 | Webb et al. | 407/113 |
| 7,407,348 B2 | 8/2008 | Sjogren et al. | |
| 2004/0234349 A1 * | 11/2004 | Ueda et al. | 407/113 |
| 2005/0230365 A1 * | 10/2005 | Lei et al. | 219/121.71 |
| 2005/0271483 A1 | 12/2005 | Sjogren | |
| 2006/0147280 A1 | 7/2006 | Sjogren et al. | |
| 2008/0283504 A1 | 11/2008 | MacGregor | |
| 2009/0223936 A1 * | 9/2009 | Glynn | 219/69.11 |
| 2012/0082521 A1 * | 4/2012 | Burtscher et al. | 407/103 |

FOREIGN PATENT DOCUMENTS

| | | |
|---|---|---|
| EP | 0996520 B1 | 12/2002 |
| EP | 1435270 A1 | 7/2004 |
| EP | 014352701 A1 | 7/2004 |
| WO | WO 9902289 A1 | 1/1999 |
| WO | WO 03070416 A1 | 8/2003 |
| WO | WO 03070418 A1 | 8/2003 |
| WO | WO 2005068129 A1 | 7/2005 |
| WO | WO 2006059949 A1 | 6/2006 |
| WO | 2010141966 A1 | 12/2010 |

* cited by examiner

METHOD OF PRODUCING HOLES AND COUNTERSINKS IN POLYCRYSTALLINE BODIES

SUMMARY

Disclosed is a method of incorporating holes and countersinks into superhard material such as polycrystalline cubic boron nitride (PCBN) and polycrystalline diamond (PCD) inserts.

The method produces a plurality of tool inserts from a body of polycrystalline superhard material, in particular polycrystalline diamond and polycrystalline cubic boron nitride on top of a tungsten carbide/cobalt composite substrate, having major surfaces on each of opposite sides thereof. The method includes the step of simultaneously producing at least two holes in the body, each hole generally extending from one major surface to the opposite major surface. The holes are produced by using a laser machine, wire electrical discharge machine and electrical discharge grinding machine. The body is severed between the holes along with the relief angles to produce the plurality of tool inserts.

An advantage of the method includes the minimization of the use of electrical discharge grinding of the entire profile of the hole. The inserts manufactured meet ISO standards regardless of the grade of superhard material. Also, a plurality of electrodes is not required, thereby maximizing the disc utilization. Severance of insert with the relief angle minimizes the finish tool-grinding to be performed on the insert.

It is to be understood that both the foregoing general description and the following detailed description are exemplary and explanatory and is intended to provide further explanation of the embodiments as claimed.

BACKGROUND

In the evolving world of cutting tools, desirable cutting inserts include those tools in which the edges are superhard and processes such as brazing in the manufacture of the finished insert are eliminated. This requirement is partially fulfilled by fully solid inserts formed from a homogenous monolithic body of superhard materials. Normally, these inserts allow cutting edges on both the top and bottom surfaces of the insert, contributing to the economic benefit of their use. In other words, they tend to be used mostly in "negative" geometries where the side faces of the inserts are perpendicular to both the top and bottom of the insert.

However, in a number of scenarios, "positive" inserts are required, i.e. the side faces are not perpendicular to either the top or the bottom of the insert and cutting edges forming only acute include angles are usable. In such inserts, the acute angled cutting edges occur on the top of the insert adjoining the hard-layer. For the raw material of the cutting tool, it is more economical to use layered superhard grades. Here, only the top layer, typically 0.5-2.0 mm thick, comprises the superhard material. The remaining portion in the bottom is composed of tungsten carbide/cobalt composites. The superhard layer is integrally bonded to the carbide layer during the sintering process itself.

An important difference between the two layers, aside from the hardness, is that the carbide layer is more easily machined with electrical discharge processes. This raw-material design removes attendant redundancy of PCBN in the fully solid inserts.

In "positive" inserts, a clamping hole in the insert becomes necessary to locate the insert in the tool-holder or cartridge pocket opposing the cutting forces. Furthermore, the sides of such inserts are required to be ground to the required relief angles. The relief angles create the positive rake angles and the acute included angles at the cutting edge.

To achieve this, current practice uses a layered superhard tip brazed in a pocket ground in a carbide insert and is subsequently ground to final dimensions. The clamping hole in the carbide insert serves to locate the insert in a tool-holder or cartridge pocket. Therefore, the amount of superhard material to be ground is only of the order of the lateral dimensions of the tip and not of the insert dimensions itself.

This process design places severe restrictions. For example, more aggressive cutting conditions may demand a larger tip be brazed in the insert. However, the space available for the tip in the carbide insert itself may itself be small. Another likely scenario is that cutting temperatures in the tip are high enough to cause de-brazing of the tip, for example, in titanium machining.

A solution to these problems is an insert with an integral clamping hole. Such an insert also increases the number of usable edges from a single tip to tips at every corner on the top face. It also allows for more compactness. For example, in a milling cutter, the integral clamping hole allows more inserts to be stacked for a given diameter, because of the room gained by eliminating top-clamps. A greater number of inserts in the cutter would allow greater feed-rate of cutting and consequently greater productivity.

However, an insert with an integral clamping hole dictates that the amount of superhard material to be ground is of the order of the insert dimensions itself, likely resulting in higher grinding cost and time. Several steps are required to reduce this cost: 1) the raw insert presented to the tool-grinder is as close to the final desired shape and dimensions as feasible; and 2) the amount of grindstock on the insert is reduced down to the depth of subsurface damage caused by insert severing processes such as WEDM and laser. To achieve this, the manufacturing process to produce this raw insert is designed to eliminate all geometrical form errors.

The three key geometrical criteria are a) perpendicularity of the axis of the integral clamping hole to the insert top, b) concentricity of the through-hole to the inscribed circle of the insert and c) proximity of edge damage on the through-hole entrance. Criteria a) and b) are important to ensure that the amount of grindstock on each side of the insert is the same. Criterion c) is important to ensure that an adequate amount of superhard material is available for incorporating a suitable chamfer and/or hone to the cutting edge and the integrity of the insert itself. Both a) and b) may be eliminated if the operation of severance of the insert and finishing of the through-hole are performed in the same setup on the same WEDM machine. Criterion c) may be eliminated if the process of obtaining the profile of the hole involves only WEDM and not electrical discharge with an electrode.

If the severance of the raw insert from the polycrystalline body is performed such that the insert sides bear the relief angles of the final finished ground insert, significant savings in grinding cost and time are obtained, since part of the superhard material removed in the tool grinding process is removed by the WEDM without impacting the finished cutting tool in any way.

In other words, it is important to exploit the flexibility of the WEDM process fully, since it represents very minimal and localized damage to the superhard material compared to electrical discharge processes using an electrode. The ability to tilt the wire while cutting superhard material is a significant facility which until now has not been utilized in the manufacture of superhard inserts with integral clamping holes.

However, one difficulty is that when surfaces cut with the wire are such that the severed part is concave upwards, there is a tendency of the severed part to drop by gravity and produce an electrical short of the wire. The manufacturing process design has to take this important factor into account.

There is a need for simplicity and uniform costs, to keep the manufacturing process standard for all grades of PCBN and PCD. The one process where different grades differ greatly is electrical discharge grinding using an electrode, though slight differences are likely in the WEDM process also. This need is particularly amplified when the lot size of inserts to be manufactured is rather large and on a recurring basis, for example in standard ISO specified inserts, unlike a one-off case of specialized geometry. Elimination of electrical discharge with an electrode on the hard-layer is the single biggest step towards achieving this goal. Such a process design vastly simplifies the finished-tool manufacturing process and provides economy of scale when inserts are produced in large quantities.

BRIEF DESCRIPTION OF THE DRAWINGS

The following detailed description can be read in connection with the accompanying drawings in which like numerals designate like elements and in which:

FIG. 7(a) shows the parent body and axis of hole-location; FIG. 7(b) shows the body with the pilot-hole cut with the laser machine; FIG. 7(c) shows the finishing of the through-hole and cutting the top-taper and FIG. 7(d) shows the finishing of the countersink.

DETAILED DESCRIPTION

Definitions

Unless defined otherwise, all technical and scientific terms used herein generally have the same meaning as commonly understood by one of ordinary skill in the art to which this invention belongs.

As used herein, each of the following terms has the meaning associated with it in this section.

"Hole" refers to a cylindrical or non-cylindrical opening into and through an object.

"Countersink" refers a non-conical curved enlargement below the entrance of a hole.

"WEDM" refers wire electrical discharge machine.

"EDG" refers to an electrical discharge grinding machine.

"Laser" refers to a laser machine.

"Hard-layer" refers to the portion of the thickness of the insert comprising of the ultra-hard material.

"Carbide-layer" refers to the portion of the thickness adjacent the hard-layer.

"Pilot-Hole" refers to the initial hole, smaller in diameter to the final required cylindrical through-hole, allowing the wire of the WEDM to pass through.

"Inscribed Circle" refers to the hypothetical circle such that it is either tangent to the all sides of the insert, if the insert is polygonal or coincides with the boundary of the insert, if the insert is round.

"Superhard material" refers to a material that has a Knoop hardness of at least about 4000. This includes sintered polycrystalline diamond and other diamond, diamond-like materials, cubic boron nitride and wurzitic boron nitride.

An embodiment includes a method of making a plurality of tool inserts from a body of ultra-hard material which has major surfaces on each of opposite sides thereof, includes the steps of producing a plurality of spaced holes and countersinks in the body, each hole generally extending from a first major surface to the opposite second major surface.

The ultra-hard material will generally be polycrystalline diamond (PCD) or polycrystalline CBN (PCBN) and may be bonded to a substrate such as a cemented carbide substrate. The ultra-hard material bonded to a substrate is defined as the body. When a substrate is present, the holes and countersinks will generally extend through both the polycrystalline ultra-hard material and the substrate. Severing between the holes to produce the inserts will also extend through both the polycrystalline ultra-hard material and the substrate. The body will generally take the shape of a disc whose diameter may range in size from about 50 mm to about 65 mm or more.

The pilot-holes may be produced using a laser machine which penetrates the surface exposed to it and drills a through-hole in the material underneath. The opening is then profiled to shape using a wire electrical discharge machine and an electrical discharge grinding machine. The body is carried from laser machine, wire electrical discharge machine and electrical discharge grinding machine without loss of coordinate references so that the holes and countersinks can be produced without loss of concentricity.

Figure 1:
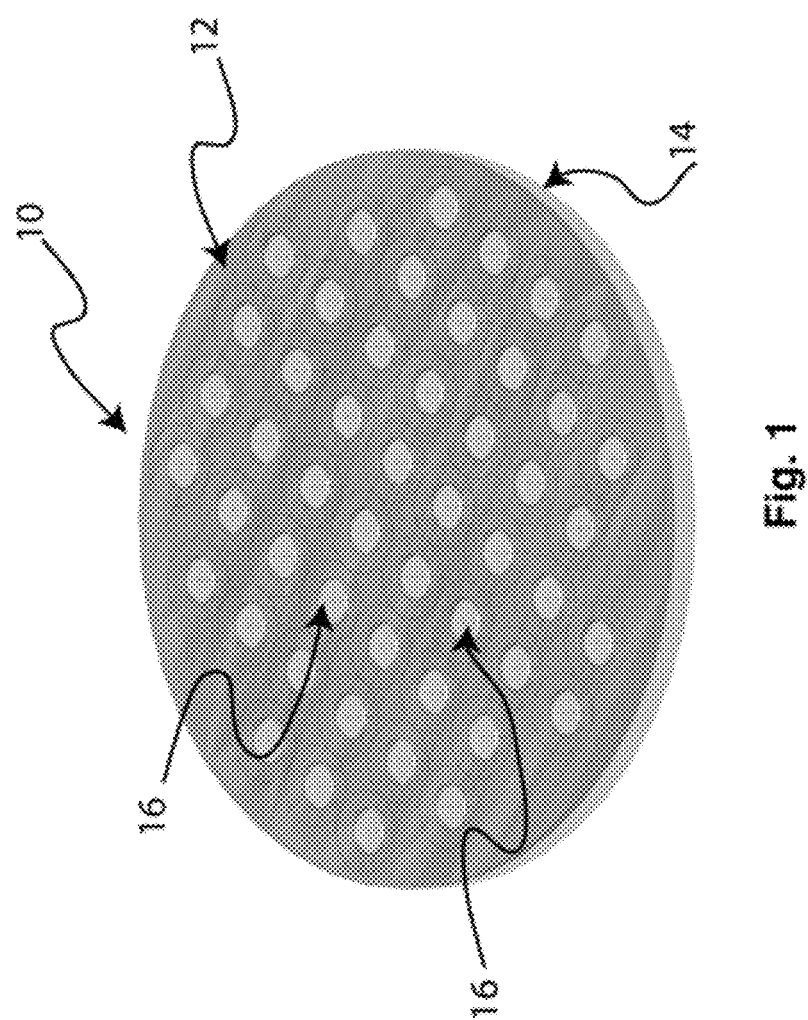
FIG. 1 is an isometric view of a disc of polycrystalline ultra-hard material illustrating an embodiment.

Embodiments will now be described with reference to the accompanying drawings. Referring first to FIG. 1, a body 10 of polycrystalline ultra-hard material has a major surface 12 and an opposite major surface 14. At least one pilot-hole or a plurality of pilot-holes 16 may be produced in the body 10. The holes extend from the major surface 12 to the opposite major surface 14.

Figure 2:
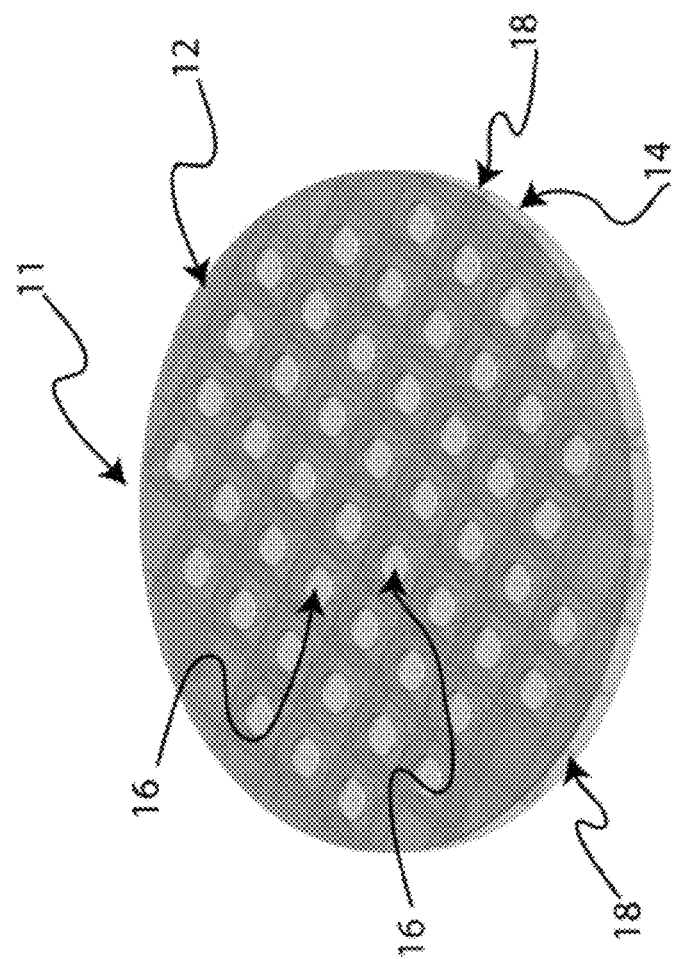
FIG. 2 is an isometric view of the embodiment in FIG. 1 showing the process of severance of individual inserts from the pattern of holes in the ultra-hard polycrystalline disc.

A plurality of tool inserts is then produced by severing inserts from the body 10, e.g. using EDM cutting or laser cutting, along the lines 18 (see FIG. 2). This results in 49 tool inserts, each with a polygonal or curvilinear shape, being produced. Each insert has a centrally located through-hole or countersink 16 extending through it. Each insert is thus capable of being clamped to a tool holder using a screw or pin lock clamping means. The thickness of the inserts may range from about 1.5 mm to about 5.0 mm with through-hole diameters ranging from about 2.15 mm to about 8.0 mm having a through-hole diameter tolerance of about +/−0.02 mm and a concentricity of less than about 0.02 mm or about 0.02 mm. The inscribed circle of the insert may be about 0.02 mm.

Figure 3:
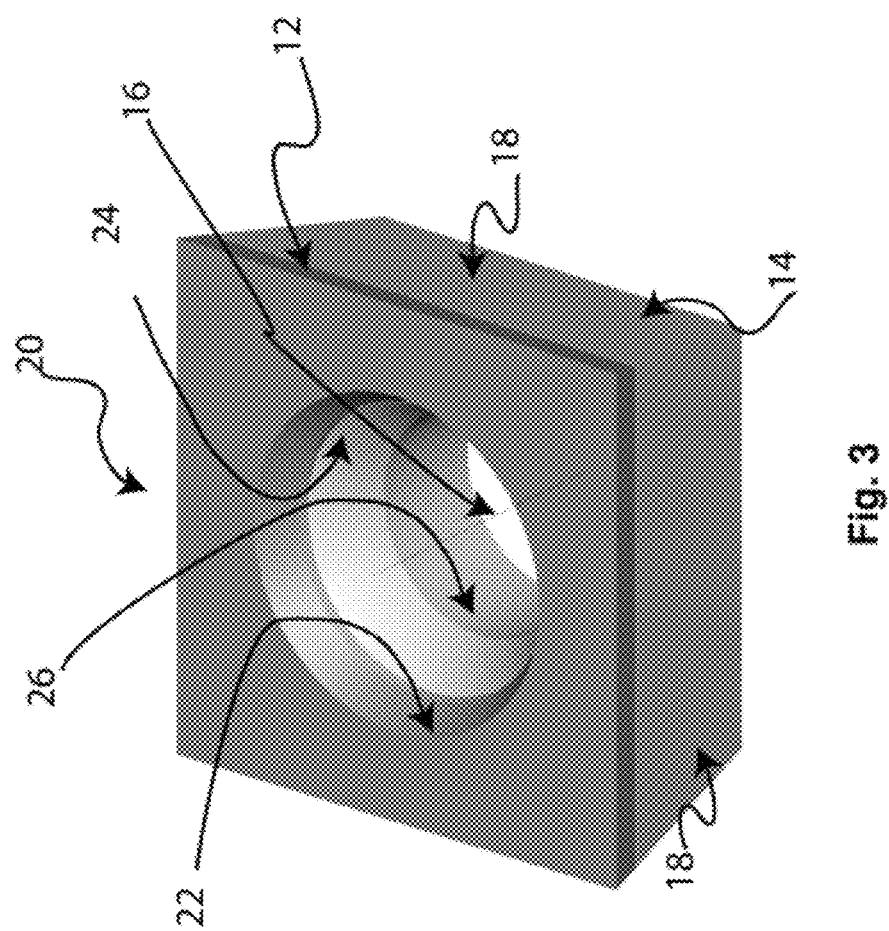
FIG. 3 is an isometric view of a single insert severed from the body.

A finished tool insert is shown in FIG. 3 and comprises a layer 12 of polycrystalline ultra-hard material bonded to a substrate, typically a cemented carbide substrate, 14. A through-hole or countersink 16 extends from the top surface of the layer 12 to the bottom surface of the substrate 14. The hole or countersink 16 has a wider diameter at the top surface resulting in a recess which can accommodate the head of a screw.

Figure 7:
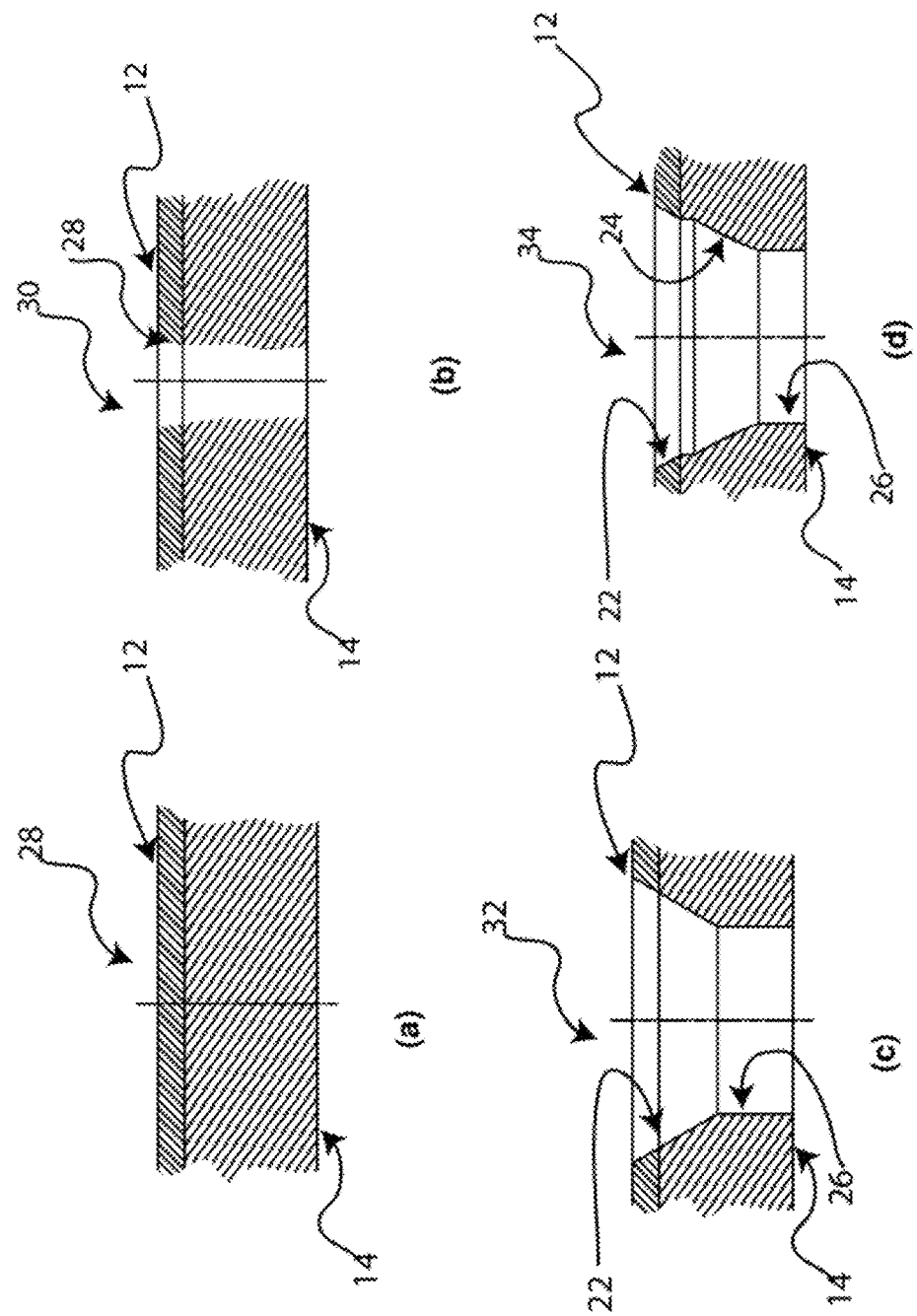
FIG. 7(a) through FIG. 7(d) show a sequence of steps of production of an embodiment.

The method of producing at least one hole or countersink in a body includes the steps shown in FIGS. 7a through 7d. As shown in FIG. 7a, a body 28 is affixed to a dedicated fixture having a holder and a pallet which position and orient the body relative to each other with high accuracy. Identical pallets are installed in each of the 3 machines laser, WEDM and EDG. The dedicated fixturing also ensures a high level of perpendicularity between the hole-axis and the insert top surface.

At least one pilot-hole 28 is formed using a laser to produce the body 30 from 28. The laser may be a LASAG laser manufactured by Lasag Lasers, Buffalo Grove, Ill. As shown in FIG. 7b, the pilot-hole extends from the first major surface 12 to the opposite second major surface 14 of the body 10. Then, as shown in FIG. 7c, a straight hole 26 and top taper 22 are formed using a WEDM to obtain the body 32.

As shown in FIG. 7d, the EDG forms a curved non-conical countersink surface 24 to obtain the body 34. Note that in this step, the EDG erodes only the carbide substrate ending in surface 14. Finally, the body is severed along the lines 18 of FIG. 2 on the WEDM as shown in along the surfaces 18 forming the relief of the insert.

The method minimizes the use of electrical discharge grinding of the entire profile of the hole, since different grades of PCD and PCBN offer different resistances to electrical erosion.

The body is carried from machine to machine without loss of references so that position and orientation in each machine is maintained. This obviates the need for a plurality of electrodes as mentioned above. A plurality of electrodes most likely entails that the electrodes be spaced more than the individual inserts can be in the body, resulting in reduced body utilization. This portability feature in the current method is also useful for part scheduling for each machine, allowing different machines to work concurrently. Concentricity and perpendicularity of the hole are accurate to the order of the positioning accuracies of the WEDM.

Figure 8:
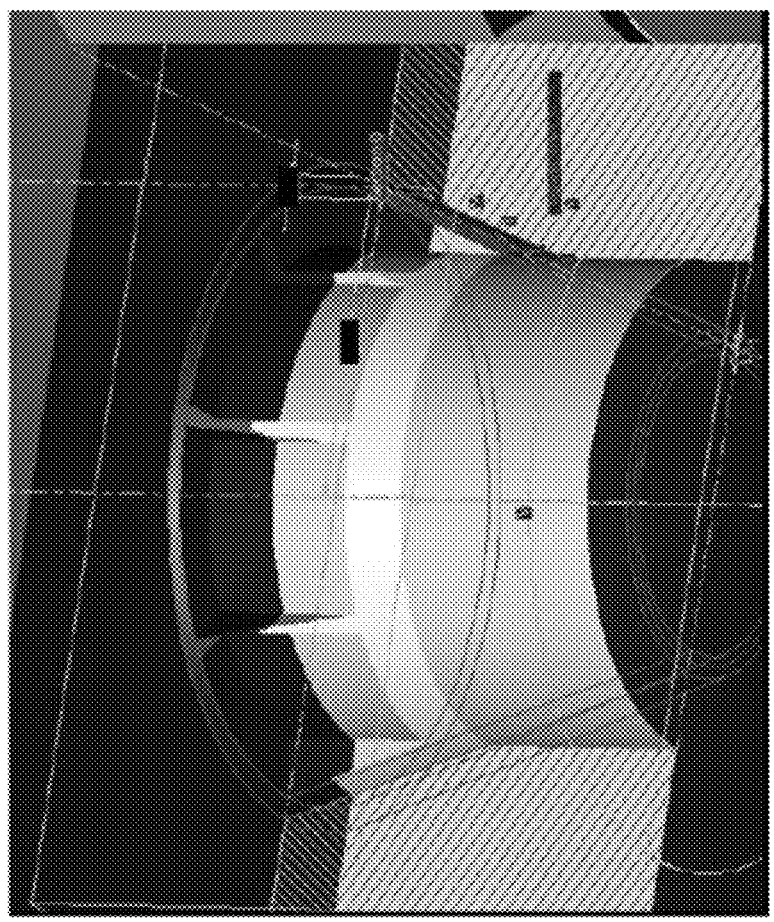
FIG. 8 shows the process of severing entrapped conical internal part in several radial fragments.

The conical part formed inside the hole while forming surface 22 (FIGS. 7c and 7d) and the finished insert itself is ejected upwards by suitably positioning and adjusting the nozzles of the WEDM. In particular, the top nozzle is made to shut-off automatically and the bottom nozzle is made to increase in pressure so that, without the risk of electrical shorting, the entrapped pieces are ejected. Electrical shorting results in excessive down-time and operator intervention. As shown in FIG. 8, a short circuit due to the entrapped conical portion may also be avoided by the cutting the conical part in segments so that each of the segments or fragments are smaller than the cylindrical portion of the through-hole 26 (FIGS. 7c and 7d). This would allow the fragments to fall down through the hole by gravity thereby preventing shorting of the wire during the process.

Since the EDG erodes only the carbide substrate of the ultrahard disc, the process is identical for all grades of PCBN and PCD. This keeps the costs low and the process flow extremely simple and easy to manage. The through-put time on all grades of PCBN and PCD would be identical. Severing the insert with the relief faces cut in the WEDM itself, enables reduction in tool-grinding of the insert.

The method has a number of advantages in producing tool inserts capable of being used in a screw or pin lock arrangement. Maximal accuracy is obtained in the location of the locking hole relative to the cutting point, both in manufacture and application of the insert. As cutting tool materials are used for precision machining, accuracy is extremely important in obtaining optimum performance.

Figure 5:
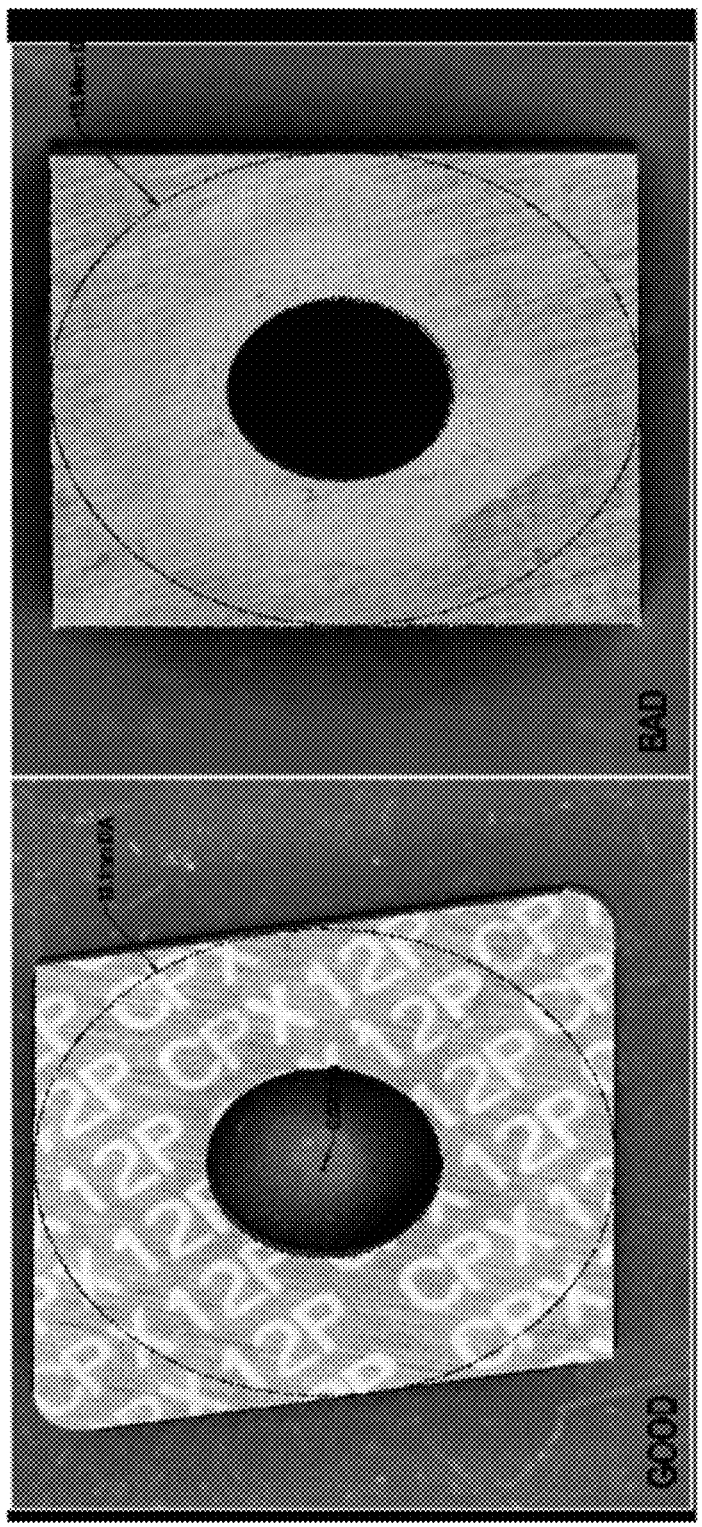
FIG. 5 is a photograph comparing the insert an embodiment to an insert formed from alternative techniques which involved incorporation of a hole after the insert was cut from the parent body.

FIG. 5 illustrates the accuracy in concentricity achieved with the present method. High accuracy in concentricity is necessary to minimize the grind-stock to be allowed on the insert for finish-grinding. Lower the grind-stock, lesser the grinding costs and time encumbered.

The insert obtained with the present method is in strict conformance to ISO standards for inserts with partly cylindrical holes. See ISO 6987:1998 "Indexable hard material inserts with rounded corners, with partly cylindrical fixing hole—Dimensions".

Figure 6:
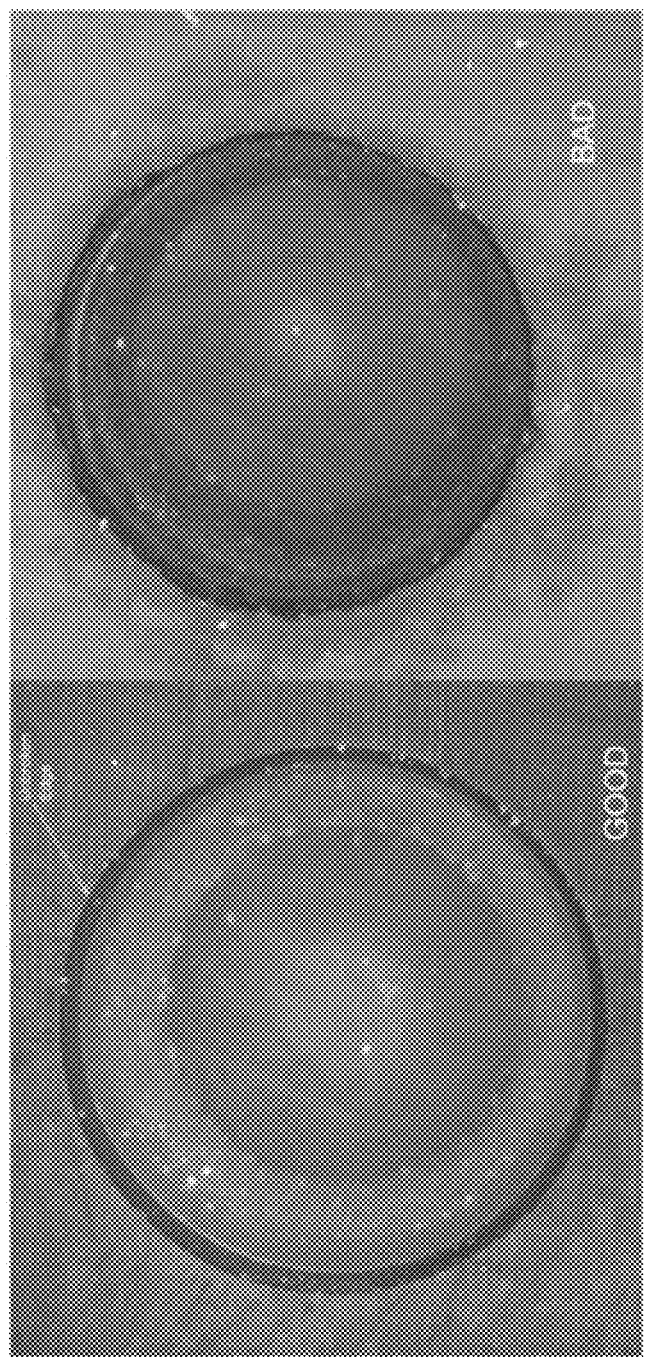
FIG. 6 is a photograph comparing the insert of an embodiment to an insert without the top-taper showing edge degradation due to the electrical discharge grinding process performed directly on the superhard surface of the body.

FIG. 6 shows the superior edge quality of the entrance achieved with the present method over alternative method. As described before, since the EDG process does not erode the hard-layer, it is left intact from the WEDM process which creates the surface 22. Hence, the hard-layer does not suffer extra damage due to the EDG process. A related benefit to the process design in the present method is that the tapered surface of the screw fastening the insert to the tool-holder rests only the carbide countersink below surface 22. Therefore, the hard-layer is not subjected to added stresses due to the fastening action itself, which may hamper tool-performance.

EXAMPLE

Figure 4:
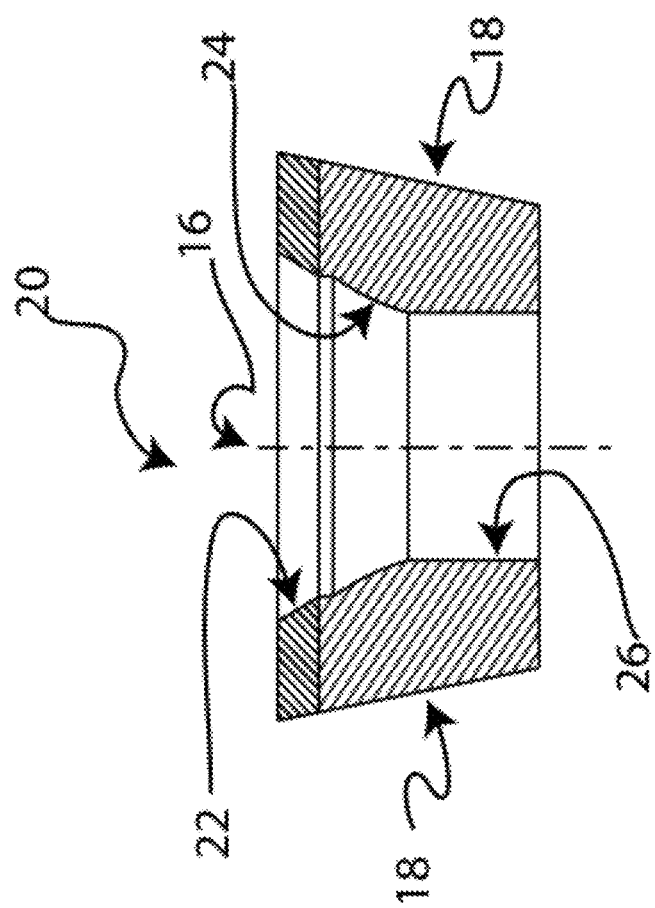
FIG. 4 is the cross-sectional view of the insert in FIG. 3.

A plurality of cutting inserts as illustrated by FIG. 3 and FIG. 4 were produced from a disc comprising a layer of polycrystalline CBN with a high content of CBN bonded to a cemented carbide substrate. The disc was held in dedicated fixturing to transport between the laser, WEDM and EDG. Machining time was three minutes per hole. Thereafter, the disc was severed along sever lines between the 18 holes to produce cutting inserts, each of the type illustrated by FIG. 3 and FIG. 4. Severing was achieved using WEDM.

What is claimed is:

1. A method of producing at least one through-hole and countersink in at least one ultrahard insert comprising:
providing a body having a first major surface and an opposite second major surface;
forming at least one pilot hole in said body using a laser, wherein said at least one pilot hole extends from said first major surface to the opposite second major surface of said body;
cutting said pilot hole using a wire electrical discharge machine to produce a straight cylindrical portion and top conical portion;
forming a countersink on at least one side of said body using an electrical discharge grinding machine; and
severing said at least one ultrahard insert from said body forming a finished insert, wherein said finished insert includes a through-hole and a countersink.

2. The method of claim 1, further comprising machining a profiled curved countersink out of the body confined to a carbide substrate of the body.

3. The method of claim 1, wherein multiple pilot-holes are formed in said body.

4. The method of claim 1, wherein said method is independent of thickness and composition of a polycrystalline cubic boron nitride or a polycrystalline diamond layer.

5. The method of claim 1, where the concentricity of the through-hole and inscribed circle of the insert is about 0.02 mm.

6. The method of claim 1, wherein the said finished insert comprises integral relief angles cut during the severing process.

7. The method of claim 1, wherein said finished insert comprises grind-stock of about 0.08 mm due to the presence of the through-hole, countersink and integral relief angles.

8. The method of claim 1, further comprising creating a top taper thereby creating an entrapped conical part.

9. The method of claim 8, wherein the entrapped conical part is ejected upwards by the wire electrical discharge machine by turning a top nozzle of the wire electrical discharge machine off and a bottom nozzle of the wire electrical discharge machine on.

10. The method of claim 1, wherein the body comprises a layer of polycrystalline ultra-hard material bonded to a substrate.

11. The method of claim 10, wherein the substrate comprises cemented carbide.

12. The method of claim 10, further comprising machining the countersink into the substrate, wherein the countersink is spaced apart from the layer of polycrystalline ultra-hard material.

13. A method of producing at least one through-hole and countersink in at least one ultrahard insert comprising the steps of:
provide a body having a first major surface and an opposite second major surface;
forming at least one pilot-hole in said body using a laser, wherein said at least one pilot-hole extends from said first major surface to the opposite second major surface of said body;
cutting said pilot-hole using a wire electrical discharge machine to produce a straight cylindrical portion and top conical portion;
forming a countersink on at least one side of said body using an electrical discharge grinding machine;
creating a top taper thereby creating an entrapped conical part; and
severing said at least one ultrahard insert from said body wherein said insert includes a through-hole and countersink.

14. A method of producing at least one through-hole and countersink in at least one ultrahard insert comprising:
providing a body having a first major surface and an opposite second major surface;
forming at least one-pilot hole in said body using a laser, wherein said at least one pilot-hole extends from said first major surface to the opposite second major surface of said body;
cutting said pilot hole using a wire electrical discharge machine to produce a straight cylindrical portion and top conical portion;
forming a countersink on at least one side of said body using an electrical discharge grinding machine;
machining a profiled curved countersink out of the body confined to a carbide substrate of the body; and
severing said at least one ultrahard insert from said body wherein said insert includes a through-hole and countersink.

* * * * *